United States Patent [19]

Michaels et al.

[11] Patent Number: 4,489,490
[45] Date of Patent: Dec. 25, 1984

[54] CABLE STRIPPER

[75] Inventors: Leonard H. Michaels, Warrenville; Jerry E. Stuart, Sycamore, both of Ill.

[73] Assignee: Ideal Industries, Inc., Sycamore, Ill.

[21] Appl. No.: 380,220

[22] Filed: May 20, 1982

[51] Int. Cl.³ .............................................. H02G 1/12
[52] U.S. Cl. ........................................ 30/90.1; 30/90.8
[58] Field of Search .................. 30/90.7, 90.1, 90.6, 30/90.4, 90.8, 90.9, 91.2; 81/9.5 R; 403/351, 352, DIG. 8

[56] References Cited

U.S. PATENT DOCUMENTS 3,665,603  5/1972  Bilbrey et al. ...................... 30/90.7
3,826,001  7/1974  Bilbrey et al. ...................... 30/90.1
4,324,502  4/1982  Pickles ................................. 403/351

Primary Examiner—Roscoe V. Parker
Attorney, Agent, or Firm—Kinzer, Plyer, Dirn & McEachran

[57] ABSTRACT

This is a cable stripper or tool for removing insulation from cable. The tool has a pair of jaws which are adapted to close on a cable with a cutting blade or tool therein so that when the cable and tool are rotated relative to each other, a cut path will be defined or applied to the cable. The tool has the capability for either square cutting, i.e. a circular cut, or peeling, i.e. a helical cut or both and will automatically apply one cut or the other depending upon its direction of rotation.

18 Claims, 40 Drawing Figures

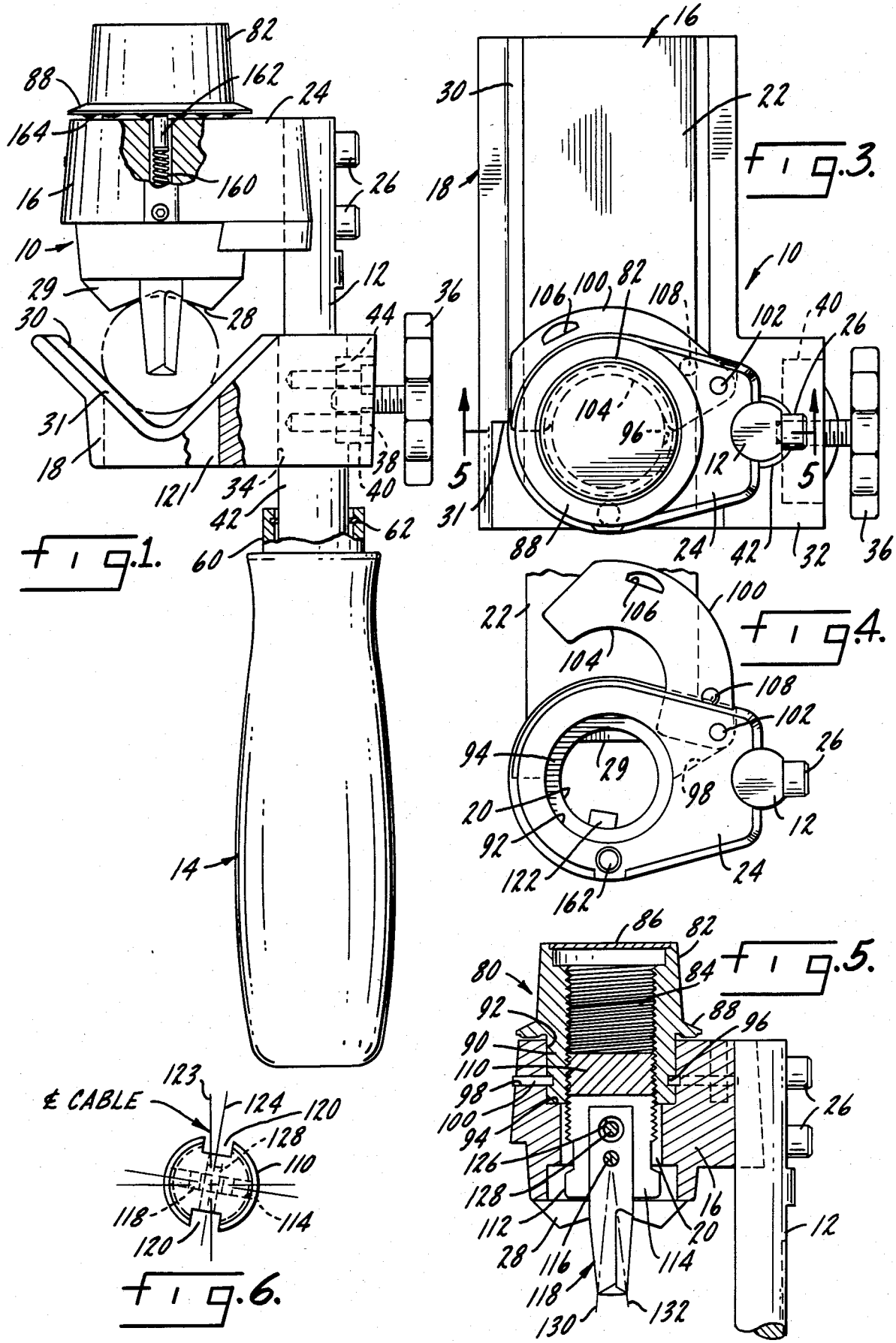

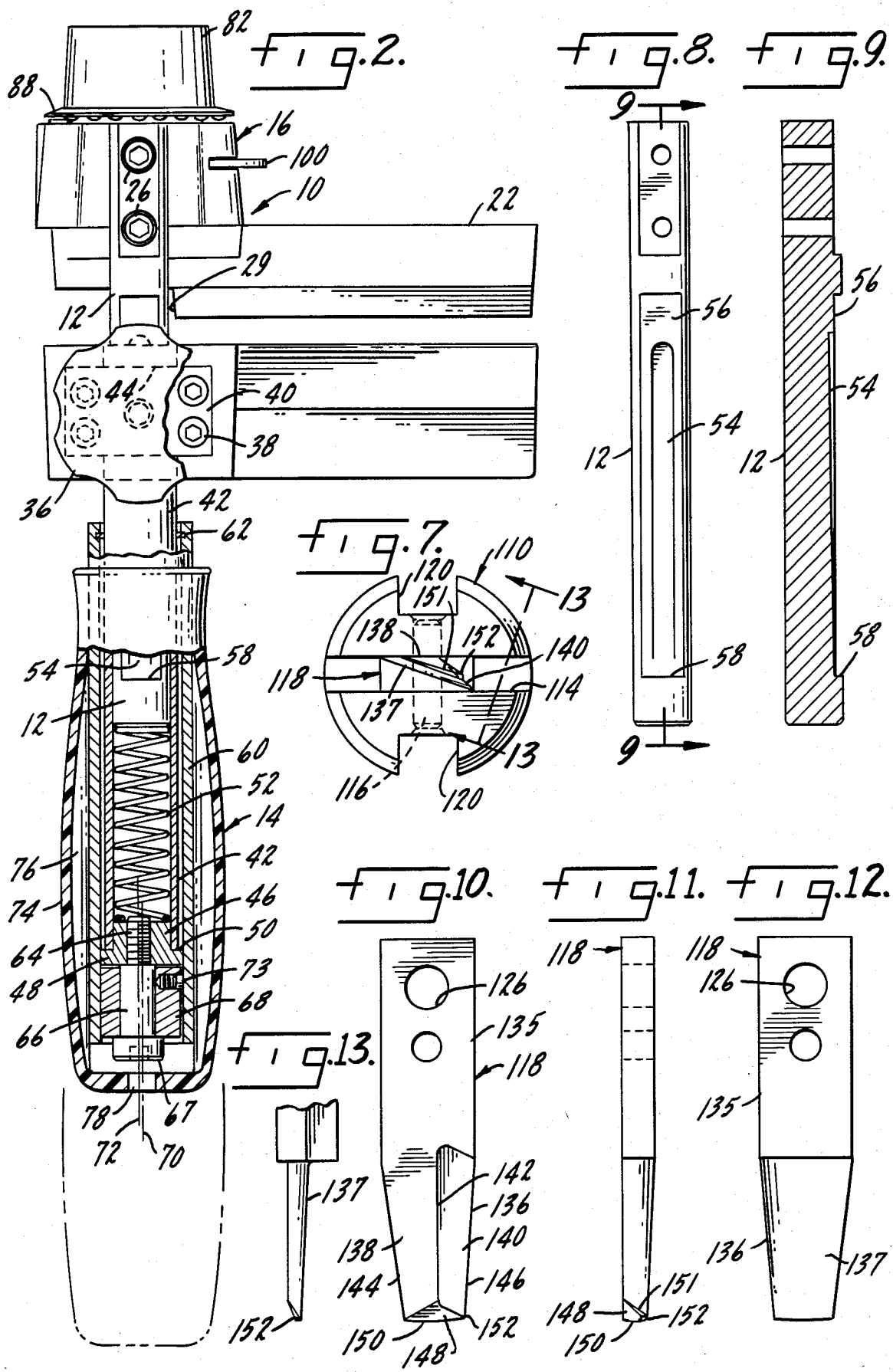

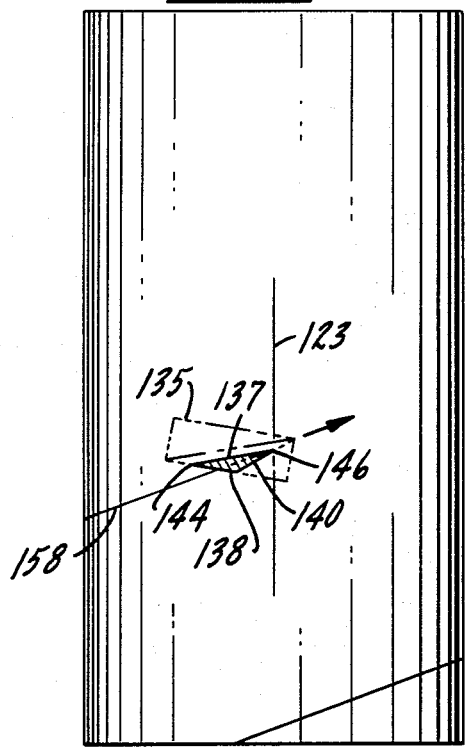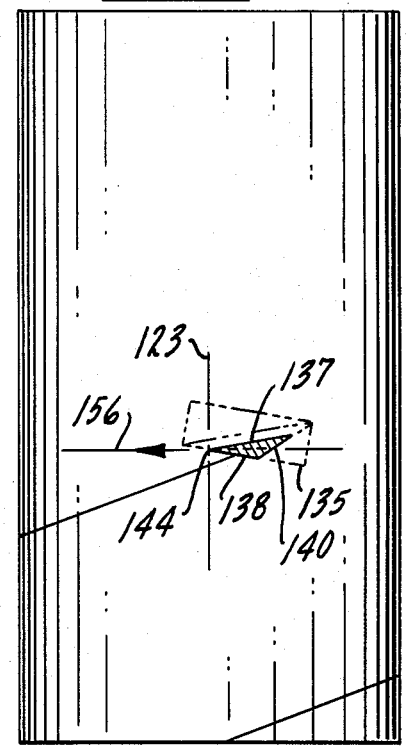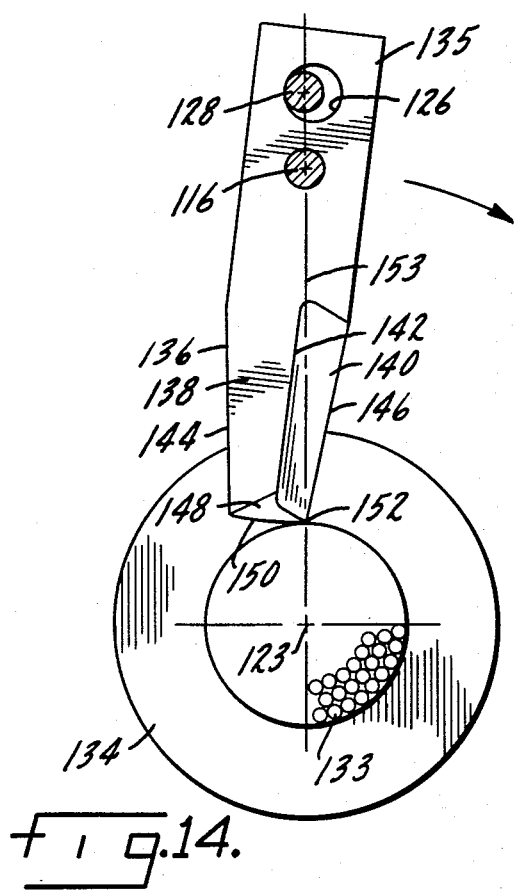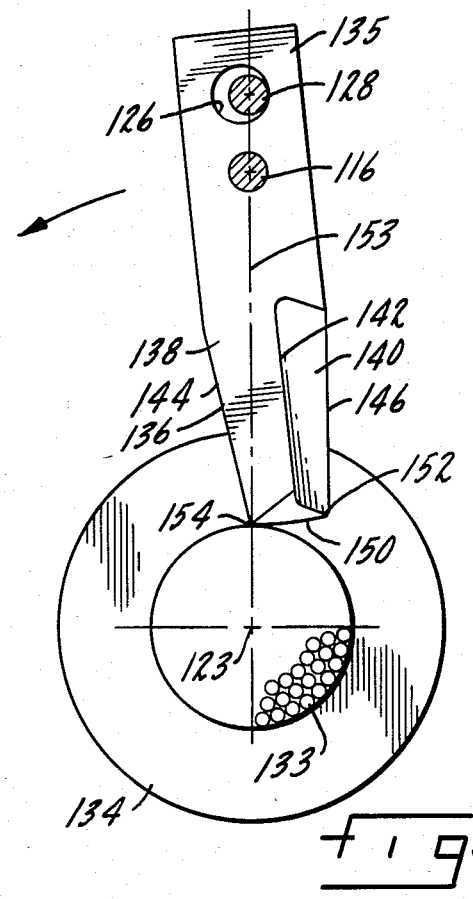

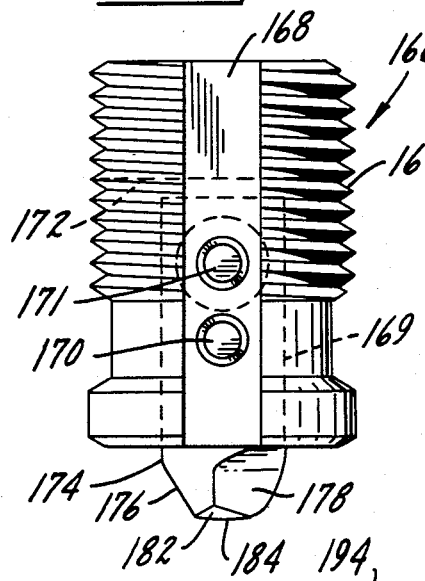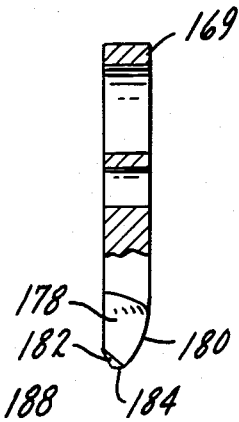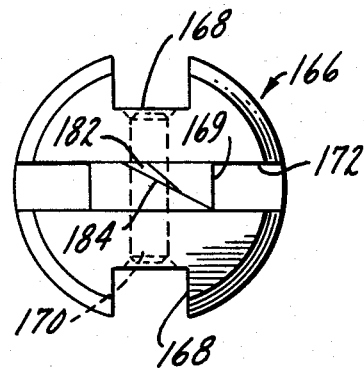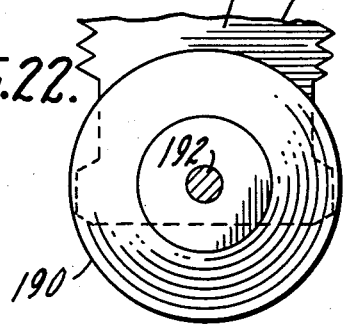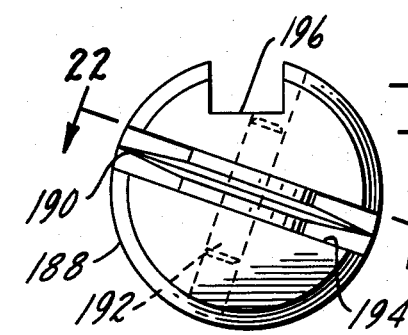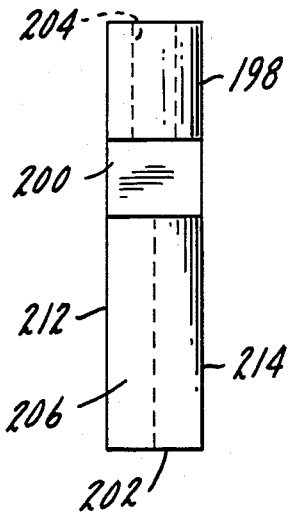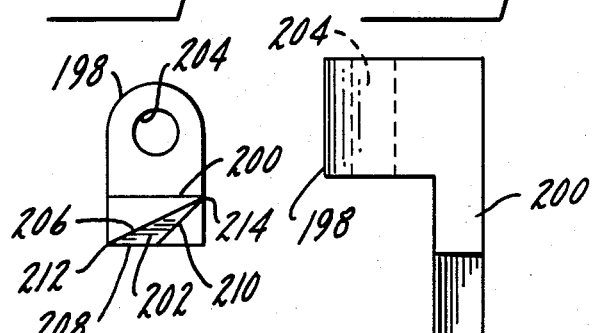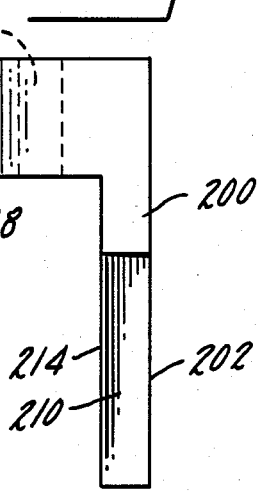

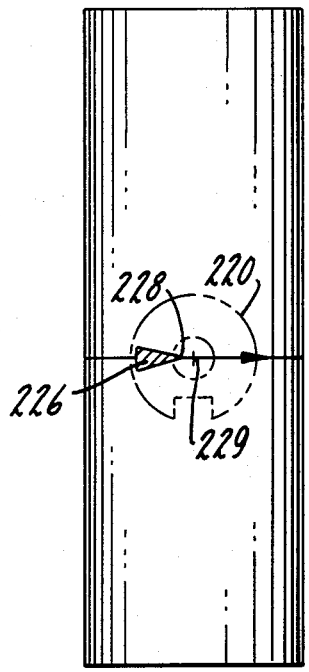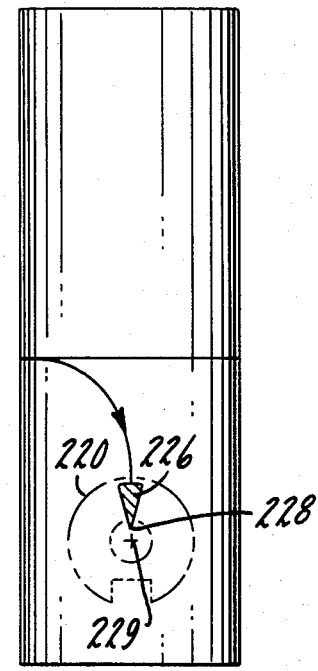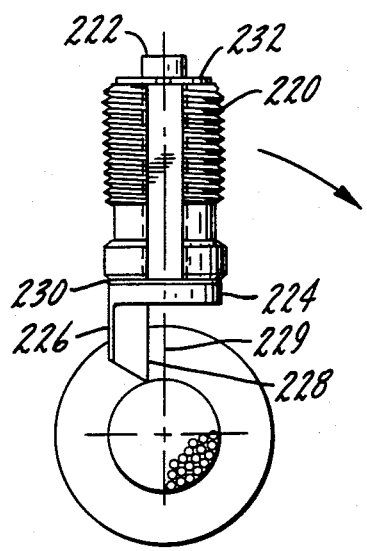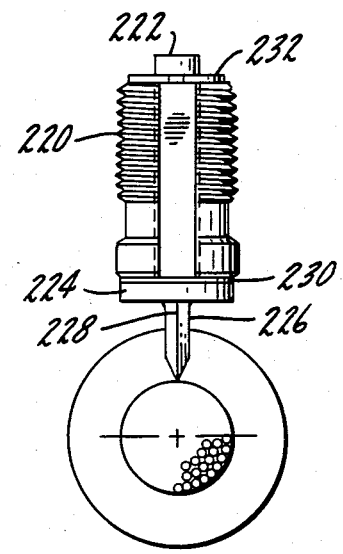

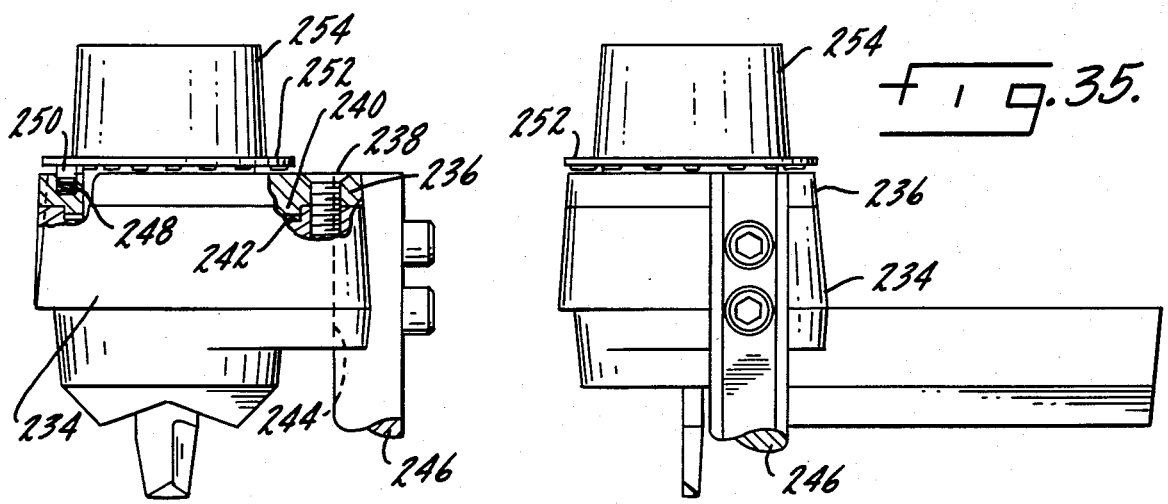
fig.34.
fig.35.
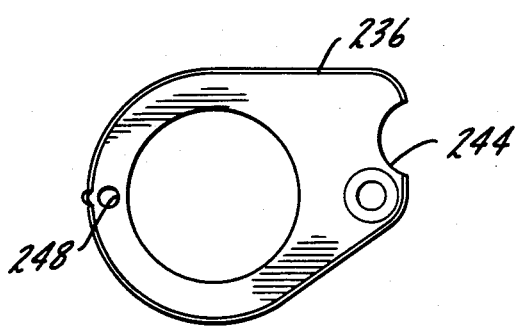
fig.36.
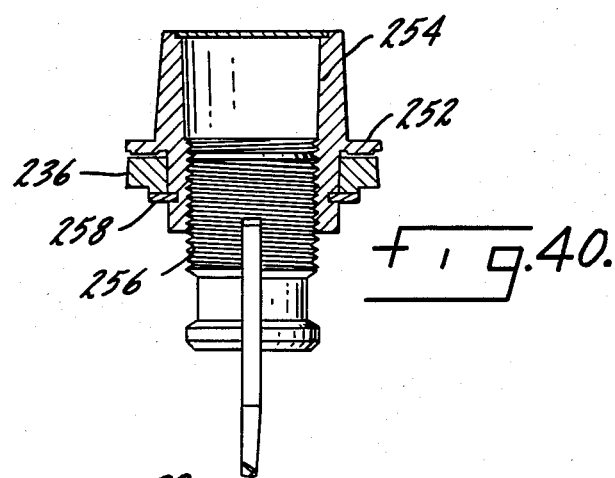
fig.40.
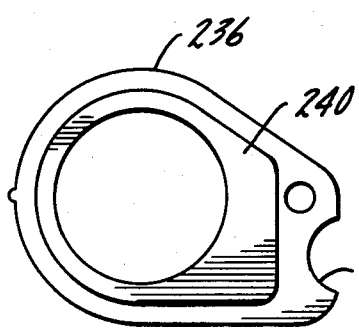
fig.37.
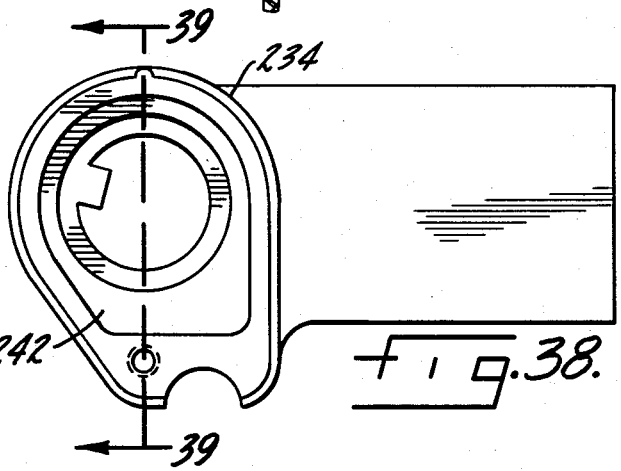
fig.38.
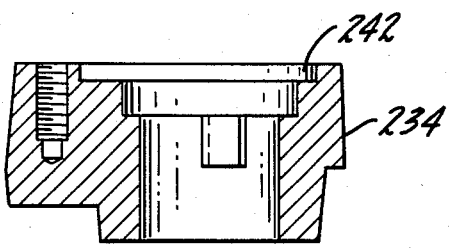
fig.39.

4,489,490

CABLE STRIPPER

SUMMARY OF THE INVENTION

This invention is concerned with a cable stripping tool and is more specifically concerned with a tool which is compact, easy to use, and can be used to apply a square cut to the insulation of a cable, meaning in a circle around the insulation or it may be used to apply a peeling cut, meaning longitudinally along the insulation of the cable or it may perform a combination of functions.

A primary object of the invention is a cable stripper which will automatically square cut the insulation of the cable when it is rotated in one direction and a peeling cut when it is rotated in the other direction.

Another object is a cartridge assembly for a cable stripper which provides or allows for interchangeability of square cutting and/or peeling and/or ripping blades which gives the basic tool great versatility.

Another object is a specific stripping blade which automatically insures an accurate square cut and peeling cut, depending upon its direction of rotation, when assembled in the tool.

Another object is a handle arrangement for a cable stripping tool which may be telescoped or collapsed inwardly for storage and/or transportation and may be pulled out to full length to give the maximum mechanical advantage during use.

Another object is a telescopic handle which is easy to operate between its extended and contracted positions and may be easily locked in either position or any position in between.

Another object is a nonadjustable blade made to a predetermined depth for use in applications where blade adjustment is undesirable.

Another object is a specific cartridge for use in removing the metallic shield on certain types of conductors.

Another object is a blade and mounting arrangement which is capable of square cutting the cable and then peeling off to the wire end.

Another object is an alternate blade which is constructed to first peel and then cut square.

Another object is a blade which may be used to first peel followed by square cut or first cutting square followed by peeling.

Another object is a jaw mechanism for a cable stripper of the above type in which the locking mechanism is self-tightening against the natural tendency of the jaws to open during stripping.

Another object is a cable stripper which is compact and integral thereby avoiding separate or loose part problems.

Another object is a cable stripper with an efficiently located center of gravity.

Another object is a cable stripper of the above type in which the lever arm or mechanical advantage applied to the blade, regardless of the direction of rotation or the type of cut, is more efficiently utilized.

Another object is a cable stripper which is specifically constructed and arranged to accommodate or be usable with a substantial range of cable sizes.

Another object is a cable stripper of the above type which will be stable over a substantial range of cable sizes.

Another object is an adjustable handle on a cable stripper of the above type which provide for efficient operation in tight or constricted areas.

Another object is an efficient latching or key arrangement so that the cutting tools in a cartridge arrangement may be changed without any loose or separate parts.

Another object is a cartridge system for a cable stripper of the above type.

Another object is a family of cartridges usable in a base cable stripping unit, all of which are interchangeable and easily socketed into or removed from the base unit.

Another object is a cartridge in which the cutting blade operates like a caster.

Other objects will appear from time to time in the ensuing specification:

BRIEF DESCRIPTION OF THE DRAWINGS

FIG. 1 is a side view of the cable stripper, partly in section;

FIG. 2 is a back view, partly in section;

FIG. 3 is a top view;

FIG. 4 is similar to FIG. 3, but a different operative position, and with parts removed for clarity;

FIG. 5 is a section along line 5—5 of FIG. 3 with some parts in full;

FIG. 6 is a top view of the insert or cartridge of FIG. 5;

FIG. 7 is a bottom view of FIG. 6 on an enlarged scale;

FIG. 8 is a side view of a part i.e. the shaft or handle;

FIG. 9 is a section along line 9—9 of FIG. 8;

FIG. 10 is a side view of the cutting blade on an enlarged scale;

FIG. 11 is a side view of FIG. 10;

FIG. 12 is a back view of FIG. 10;

FIG. 13 is a partial view of the cutting blade as viewed along line 13—13 of FIG. 7;

FIG. 14 is a side view of the blade in one operative position with a cable;

FIG. 15 is a top view of the cable with one diagram of the blade superimposed thereon;

FIG. 16 is similar to FIG. 14 but of a different operative position;

FIG. 17 is like FIG. 15 but with the blade simulation shown in the operative position of FIG. 16;

FIG. 18 is a side view of an insert or cartridge with an alternate form of blade;

FIG. 19 is a side view of the blade of FIG. 18 and partly in section;

FIG. 20 is a bottom view of FIG. 18;

FIG. 21 is a bottom view of an alternate form of cartridge;

FIG. 22 is a section along line 22—22 of FIG. 21;

FIG. 23 is a front view of an alternate form of blade;

FIG. 24 is a bottom view of FIG. 23;

FIG. 25 is a side view of FIG. 23;

FIG. 30 is a side view of an alternate form of cartridge superimposed on a cable;

FIG. 31 is a top view of the cable with the FIG. 30 cartridge superimposed thereon;

FIG. 32 is similar to FIG. 30 but with the cartridge in a different operative position;

FIG. 33 is like FIG. 31 but of the FIG. 32 position;

FIG. 34 is similar to the top portion of FIG. 1 but of a modified form;

FIG. 35 is a side view of FIG. 34;

FIG. 36 is a top view of the adapter or top cap used in FIG. 34;

FIG. 37 is a bottom view of FIG. 36;

FIG. 38 is a top view of the upper housing with the tool holder and upper cap removed.

FIG. 39 is a section along line 39—39 of FIG. 38; and

FIG. 40 is a side view partly in section of the tool holder or cartridge used in the forms of FIGS. 34-39.

BRIEF DESCRIPTION OF THE PREFERRED EMBODIMENT

Figure 27:
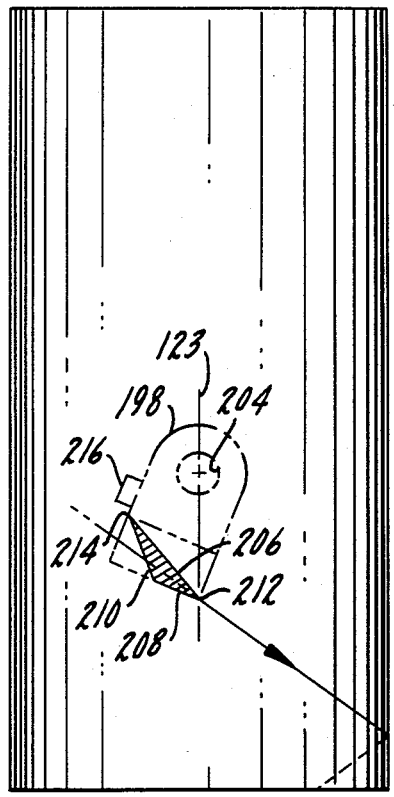
FIG. 27 is a top view of a cable of FIG. 26 with a section of the blade superimposed thereon.

In FIG. 1, the tool or cable stripper has been shown as including a head 10 mounted on a shaft 12 with a handle 14 on the other end. The head includes what may be considered an upper jaw or body 16 and a lower jaw or body 18 which, between them, define a cable receiving zone.

The upper jaw or body 16 includes an element or frame with a socket or opening 20 at one end and an elongated support frame 22 at the other. The socket end may be considered the head end and the side thereof has a boss 24 which is connected to the upper end of the shaft 12 by suitable screws or bolts 26 or the like. Substantially all or a substantial extent of the upper body has a V-shaped lower surface or cradle 28 which extends from the foot end and terminates short of the socket 20 as shown in FIG. 2, providing a ledge 29.

The lower body or member 18 has a corresponding but somewhat enlarged opposing V-shaped trough 30 so that the cable receiving zone is defined between them. The lower trough extends or may extend most of the full length with a ledge or shoulder 31 opposite ledge 29 in the upper jaw so that the cable will be fully supported and firmly held between the jaws but will have some freedom to adjust or accommodate itself at the point where the insulation is being cut and stripped. The lower jaw has a boss 32 on one side thereof at the head end. The boss has a channel therethrough, as at 34, for the shaft of the handle with a hand wheel and set screw 36 on the side thereof which bears against the shaft 12. It will be understood that when the set screw 36 is released, the shaft 12 may be moved up or down relative to the lower jaw 18 so that the cable receiving zone may be enlarged or diminished, to be explained in detail later. Four bolts or screws 38 pass through a locking plate 40 and socket into the boss 32 of the lower jaw.

The handle 14 includes a sleeve 42, the upper end of which extends up into the channel or opening 34 and the lower jaw with a cutout 44 in the side thereof to accept the locking plate 40. The sleeve 42 ends at the upper surface of the boss 32 and the shaft 12 extends down into it, being somewhat smaller in diameter.

As shown in FIG. 2, the lower end of the sleeve 42 is closed by a plug 46 which has an outstanding flange 48 on the lower end thereof providing a shoulder 50. A spring 52 is positioned inside of the sleeve between the plug and the lower end of shaft 12 to bias the shaft upwardly. When the hand wheel of the set screw 36 is backed off to release the shaft, the spring will cause it to rise, thereby opening up the cable receiving zone. Conversely, when the operator wants to close the zone somewhat to accept a smaller cable, the upper head and shaft must be pushed down to the desired position compressing the spring and the set screw tightened.

It will be noted in FIGS. 8 and 9 that the inner end of the set screw 36 engages a ramp slot 54, which as shown in FIG. 9, is somewhat tapered out in a downward direction so that the upward bias of the spring causes the shaft to self-tighten against the set screw 36. The flat 56 on the side of the shaft which has the ramp slot 54 ends at its lower end in a shoulder or abutment 58 which is dimensioned to engage the lower edge of locking plate 40 when the upper head is raised to its maximum extent thereby acting as a stop.

There is an outer sleeve 60 in the handle which is adapted to slide up and down on the inner sleeve 42 with a snap ring 62 on the inside of its upper end which is constructed to engage the shoulder 50 on plug 46 when the outer sleeve is extended to the maximum extent with the snap ring 62 acting as a stop.

The plug 46 has a threaded bore which accepts the threaded end 64 of a bolt 66 the head 67 of which is spaced somewhat from the lower end of the plug 46 to accept and hold cam ring 68 which is freely rotatable on bolt 66. It will be noted that the threaded bore in plug 46 is drilled somewhat off center so that the center line 70 of the plug 46, sleeve 42, etc. is somewhat eccentric to the center line 72 of the bolt 66. The outer surface of the cam ring 68 is concentric to the center line 70 while its inner surface is concentric with the center line 72 which is to say that the passage through the cam ring is also eccentric to its outer surface. The cam ring may have a spring biased plug 73 to create a little friction. The result is that when the outer sleeve 60 is rotated, the frictional drag on the cam ring 68 will tend to rotate it which will result in the misalignment of the eccentrics thereby jamming and locking the cam ring between bolt 66 and sleeve 60. When sleeve 60 is rotated in the other direction, which will tend to realign the eccentrics, the cam ring will unlock. The result is that when the cam ring is unlocked, sleeve 60 may be slid in and out on sleeve 42 and, when in the desired position, the outer sleeve may be rotated in either direction which will cause the cam ring to lock in place. Then the device may be used and when the operator has completed a stripping operation and wants to store the unit, he can rotate the outer sleeve 60 in the opposite direction until the cam is unlocked and then slide the handle to its inward position, rotate the outer sleeve and lock it again there. It will also be noted in FIG. 2 that a plastic or rubber grip 74, preferably with a plurality of radial ribs 76 on the inside may be slipped over the outer sleeves 60 in a slight interference fit with an opening 78 in the end thereof to break the vacuum all of which may look like a bicycle handle grip.

Referring to FIGS. 1 through 6, the socket 20 accepts a cartridge, indicated generally at 80, which is shown as having a top cap 82 with a central threaded bore 84 closed on top by a name plate 86 with an outstanding flange 88 on its outer surface between its ends. The hub 90 below the flange 88 fits into a socket portion 92 in the upper jaw and engages a shoulder 94 so that a groove 96 in the hub is lined up more or less with a slot 98 in the housing or jaw so that a key or latch 100, shown in FIGS. 3 and 4, and pivoted at 102 on the boss 24, may pivot from the FIG. 4 release position to the FIG. 3 locked position so that the arcuate inner edge 104 will releasably fit into a suitable part of the groove 96 surrounding the cartridge to hold the cartridge releasably in the socket. A finger grip or slot or hole 106 may be provided on the exposed edge of the key as shown in FIG. 3. And the key may have a detent 108 so that when it is fully closed in as in FIG. 3, it snaps into place and the detent 108 will hold it in its closed position.

A blade holder 110 in the form of a threaded cylinder or plug fits in the threaded bore 84 of the cap. As shown, the upper portion of the cylinder or insert is threaded while the lower part ends in a cylindrical boss 112. A cross slot 114 extends diametrically through the lower part of the blade holder with a pivot pin 116 there across in a suitable hole holding a blade 118 which, as shown, extends below the lower end of the blade holder by a selected extent. The blade holder has an axially disposed key slot 120, in FIG. 6, along each side thereof which fits on a key 122, shown in FIG. 4, in the bore 20 of the socket so that the blade holder may move up and down but not rotate. The user may insert the cartridge to fit either slot 120 with the key 122 so that he has his choice of turning directions for peeling and square cutting. Thus, rotation of the hand wheel or cap 82 will cause the holder to move up or down due to the threaded engagement between the two and the key and slot keep the blade holder from turning. The lower jaw may have a slot 121 through it to prevent the blade from hitting when it is turned all the way down. As shown in FIG. 6, the center line of the cable receiving zone, as indicated at 123, and the center line of the blade pivot, indicated at 124, are at a slight angle to each other, for reasons to be explained hereinafter, and intersect generally in the center of the blade holder. The upper part of the blade has an oversized hole 126, in FIG. 5, which fits around a pin 128 functioning as a stop so that the blade may pivot about its pin 116 between two positions, indicated at 130 and 132 in FIG. 5.

The action of the blade is shown in FIGS. 14 through 17 with the cable and its insulation being indicated at 133 and 134. The blade itself is shown in FIGS. 10-13. FIGS. 14 and 16 show the blade in its two pivoted positions while FIGS. 15 and 17 are plan views of the cable with the projection of the blade being diagrammatically shown thereon. The blade itself, as shown in FIGS. 10-13, has an upper rectangular shank 135 above and including the pivot coming down to a lower tapered end portion 136. The rectangular shank has been shown in outline at 135 in FIGS. 15 and 17. The tapered lower end has three basic surfaces. A rear surface 137 is flat and is tapered inwardly and at an angle to the blade pivot. The front is divided into two surfaces 138 and 140 which, as shown in FIG. 15, are at an angle to each other and are also tapered inwardly so that, as shown in FIGS. 10 and 12, the lower portion of the blade, made up of three surfaces, in the nature of a triangle, more or less uniformly decreases in cross section toward the lower edge or end with the two front surfaces 138 and 140 intersecting in a line 142. The intersection of back surface 137 with one of the front surfaces 138 gives a cutting edge 144 which shall be referred to as the square cutting edge since it tends to cut a square line around the insulation in a circle, while the rear surface 137 intersects the other front surface 140 in another cutting edge 146 which may be referred to as the peeling cutting edge because it tends to apply a peeling cut to the insulation, meaning that it creates a helical cut. The end of the blade is beveled in or shaped on something approaching a 45° angle, as at 148, so that it intersects the back surface 137 in an arc 150 which is swung about the pivot 116. The lower or arcuate surface or cutting edge 150 is formed into a shallow triangle, as at 151 in FIG. 7, with its point at cutting edge 144 and its narrow base at cutting edge 146. The inclined front surface 140 is undercut at or adjacent to the base of the triangle 151 to produce a lifting hook or ledge 152 which, when the unit is being used to apply a peeling cut, will tend to lift the insulation away from the cable.

As shown in FIGS. 14 and 16, the blade will rock or pivot between the two positions shown. In the position of FIG. 14 where the blade has been rocked somewhat clockwise, the rocking motion has been caused by the cable stripping unit being turned, relative to the cable, in a clockwise direction, as viewed in FIG. 1. The cutting edge 146 thus becomes the forward cutting edge and the resistance of the insulation to the cutting action of the blade will cause the blade automatically rock to the position shown in FIG. 14. And when the oversized hole 126 hits the pin 128, the sharp edge or point 152 will be more or less lined up in the plane 153 of the center line 123 of the cable and the pivot 116.

On the other hand, when the cable stripper is rotated in the opposite direction i.e. meaning counterclockwise in FIG. 1, the resistance of the insulation on the cable will cause the blade to pivot in the opposite direction, as shown in FIG. 16. And when the other side of the oversized hole 126 hits the stop or pin 128, the other point 154 at the end of the other cutting edge 144 will be lined up, more or less, in the plane 153 of the center line of the cable and the center of the blade pivot.

As shown in the projections of the blade on the cable in FIGS. 15 and 17, and as mentioned earlier, when the cable stripper is rotated so that the cutting edge 146 is effective, the blade assumes a position, when projected, as in FIG. 15, behind or lagging the center line of the cable whereas the opposite is true when the unit is rotated in the other direction, as noted in FIG. 17. The line of the cut in the insulation will always bisect the two sides of the blade that define the cutting edge. As shown in FIG. 17, these two sides are 137 and 138 and the line bisecting their angle is shown at 156 which is a circular square cut around the cable. When rotated in the opposite direction, the cutting edge 146 is defined by the two sides 137 and 140, in FIG. 15 and the line bisecting their angle as at 158 is on a helix so that the cut on the insulation will tend to peel. Since the blade will automatically assume either one position or the other, depending upon which direction the unit is rotated, the device will automatically tend to peel the insulation when rotated in one direction and cut square when rotated in the other direction. Thus, the operator does not have to make any adjustments in the unit itself; rather, it is just a matter of rotating the device one way for one type of cut and the other way for the other.

To regulate the depth of cut, the operator rotates the top cap 82 until the degree of projection of the blade into the cable receiving zone is as much or as little as he wants. The upper part or body may have a socket 160, in FIG. 1, which accepts a spring and detent 162 that projects against the bottom of the flange 88 on the top cap to ratchet against a plurality of projections 164 with suitable indicia being provided on the upper surface of flange 88 so that the operator may turn the top cap to any selected position with the indicia showing or indicating the degree of extension of the blade i.e. the setting of the unit for a particular depth of cable cut.

It will be noted in FIG. 6 that the pivot of the blade is offset or at an angle to the center line of the cable by a small amount, for example, something on the order of 5-15° or something of that order. On the other hand, the pivot could be parallel to the axis of the cable. The point of the matter is that when either peeling or scoring first followed by the other, the peeling action of the peel edge 146 in FIGS. 14 and 15 will leave a slight indent or flap in the shoulder of the insulation after the score cut is completed. And to minimize the extent or degree of indent of this flap, the axial distance between the score edge 144 and the peel edge 146 should be at a minimum. And this axial distance is determined or influenced by the included angle of the sides 137 and 138 that define the score edge 144 and the thickness i.e. from edge 144 to 146, which diverges upwardly. By turning the axis of rotation 124 to a slight degree, this axial distance between 144 and 146 may be minimized. But this will depend upon how the three sides etc. of the blade are ground, and the grinding could be such that the effective shank of the blade i.e. the shaded triangle in FIGS. 15 and 17 and the attack angles and edges etc. could remain in the same orientation but the upper shank 135 as indicated by the rectangular outline on FIGS. 15 and 17 could be directly on the cable axis and the perpendicular thereto which would put the pivot 116 for the blade on an axis parallel to the cable axis.

A variant form of cartridge has been shown in FIGS. 18-20. The insert, designated generally 166, as before, has a threaded upper portion or shank 167 of suitable length to fit into the same top cap or knob, such as at 82 in FIG. 5, with key slots 168 to accept the key 122 in FIG. 4. The insert itself may be considered the same and only the blade 169 has been changed. The pivoting relationship may be the same with the pivot 170 and a stop arrangement 171 above it with the blade pivoting in a cross slot 172. The blade has a substantially shorter projection at 174 with two inclined surfaces 176 and 178 on the front face in FIG. 18 and the curved underface 180 on the back side. The front faces have also been ground off at something on the order of 45°, as indicated by the surface 182 with the lower edge thereof 184 being on an arc swung about the pivot 170. As shown in FIG. 20, the bottom arcuate cutting edge 184 is shown with the inclined surface 182 that forms the lower end into a cutting edge.

The blade shown in FIGS. 18-20 may be used in the manner previously described in connection with the FIG. 10 blade. On the other hand, it may be used to square cut first and peel second, meaning that the tool may be located a certain distance in from the end of the cable and turned in its square cut direction with the blade first turned in to full depth. Then the tool would be turned in the opposite direction so that a peeling cut would be taken, and at full depth.

In FIGS. 21 and 22, a further variant form has been shown in which the blade has been converted to a wheel. The insert itself is diagrammatically indicated at 188 with the wheel 190 pivoted at 192 in a slot 194. As before, the insert would have a suitable key slot 196 on each side. In this arrangement, the wheel could be free wheeling so that it would compress the insulation and divide or sever it by pressure alone with the sharp outer edge of the wheel. Or the wheel could have a drag so that while it would turn from time to time or slowly so as to present an everchanging outer edge to the insulation, it would drag through the insulation and thereby tend to saw or cut. The outer edge in fact might be formed into notches or provided with sawteeth of any suitable configuration and shape. As before, this insert would be positioned in a cap such as at 82 in FIG. 5 which might be made as a standard unit with various types of inserts provided for use therein.

In FIGS. 23-29, a variant form of the blade has been shown in which the head portion 198 in the nature of a boss or enlargement is integral with a shank 200 and a blade portion 202. The lug or boss has an opening 204 for a pivot pin and it will be noted in FIGS. 26-29 that the blade pivots about an axis generally at right angles to the axis of the cable. The blade portion has a flat surface 206 on one face and two intersecting surfaces 208 and 210 on the opposite face, each of which intersects the flat surface 206 in a cutting edge as at 212 and 214.

The operative positions of the blade are shown in FIGS. 26-29 where a cross section of the blade is shown with the lug and shank superimposed thereon with the cable in the background. The blade structure freely pivots about pivot 204 and engages stops, one indicated at 216 in FIG. 27 which is the peel position and the other indicated at 218 in FIG. 29 which is the score position. Since edge 214 is shown as being in engagement with the cable in FIG. 29 and the bisect at its included angle is perpendicular to the axis of the cable, it will cut a score around the cable. As shown in FIG. 27, when edge 212 engages the cable, the bisection of its included angle will be at an inclined angle to the axis of the cable thereby tending to peel the insulation.

Figure 29:
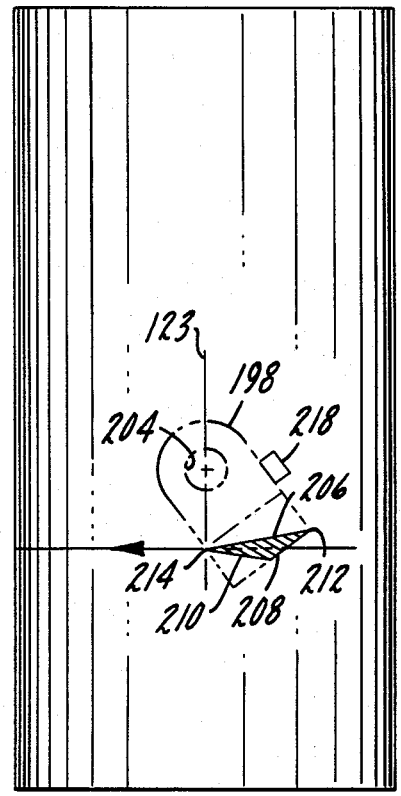
FIG. 29 is similar to FIG. 27 but with the blade section in the position of FIG. 28.
Figure 26:
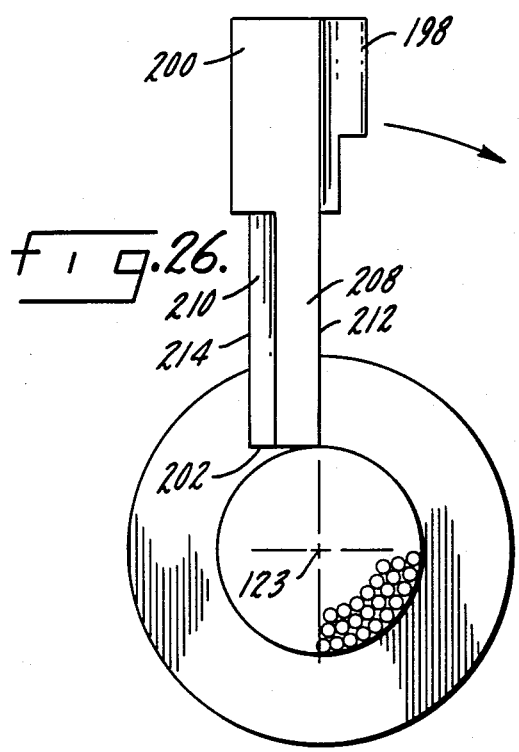
FIG. 26 is an end view of a cable with the FIGS. 23-25 blade therewith.
Figure 28:
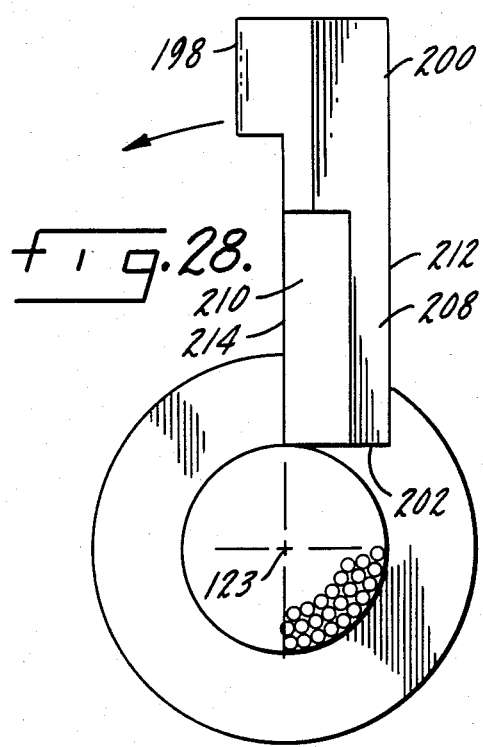
FIG. 28 is similar to FIG. 26 but of a different operative position.

With a blade of the type shown in FIGS. 23-29 mounted in an insert of the type generally indicated at 110 in FIG. 5, the blade would freely pivot between stops 216 and 218, depending upon the direction of rotation of the unit relative to the cable so that it would automatically score when rotated counterclockwise, as indicated in FIG. 29 and automatically peel when rotated clockwise, as indicated in FIG. 27. A blade of the type shown in these Figures would have the advantage that preparation of the various angles would be simplified as compared to the blade shown in FIG. 5 but, on the other hand, it would have the disadvantage that the force applied to the ends of the blade would tend to twist or torque the pivot which would not be true of the FIG. 5 form. This is to say that each type of blade has its advantages.

In FIGS. 30-33, a variant form has been shown in which an insert or plug 220, similar in construction, design and function as the previous plugs, has a shaft or rod extending down the middle thereof, as at 222, with an enlarged shoulder 224 below the lower end of the plug and an offset cutting head or blade 226. The blade has a cutting edge 228 which is offset somewhat from the center line 229 of the rod 222 which extends through the center of the cable. The rod is freely pivoted in the plug 220 so that the cutting blade 226 will have a caster effect and will always trail behind the direction of movement of the unit. A washer of nylon 230 or the like may be used for antifriction purposes and the upper end of the rod or shaft 222 may be fixed by a snap ring 232 which may fit in a groove in the upper end of the rod or shaft extending above the plug. Also, an anti-friction washer may also be used on top, if desired.

In FIGS. 34-40, a variant form has been shown in which the upper body 234 has been shortened somewhat vertically, relative to the one shown in FIG. 1, and a cap retainer in the form of a plate 236 is mounted thereon by a suitable screw 238 or the like. The cap retainer has a boss 240 which projects from its lower surface into a recess 242 in the upper body with the cap retainer having a cutout 244 to accommodate the upper end of the shaft 246. The upper surface of the cap retainer has a shallow socket 248 to accept a spring in detent 250 which engages the lower surface of the flange 252 on the top cap 254 for the detenting action similar to that described previously.

The cartridge itself is shown in FIG. 40 and includes a blade holder 256 threaded into the lower end of the top cap 254 with the cap retainer 236 held against the flange 252 by a snap ring 258. In this arrangement, the cartridge can be taken out and inserted as a unit with the cap retainer 236 forming a part thereof. To remove the cartridge, as shown in FIG. 34, the screw 238 is removed and the entire cartridge and upper cap retainer will come off. Then a new one may be inserted with the new one including its own cap retainer. Or the same top cap and cap retainer might be used with a new tool holder 256 and tool screwed into the bottom thereof as the old one is removed.

The use, operation and function of the invention are as follows:

The cable stripping unit has the advantage that it will automatically either peel or cut square, depending upon which way it is turned on the cable. Also, it can peel first, say, from the end of the cable inwardly to a selected point and then automatically cut square by turning the unit in the opposite direction. Or, it can cut square first by positioning the unit a certain distance down the cable and, after a square cut has been effected, it will then automatically peel to the end of the cable by rotation in the opposite direction. Or it may be used to create a window, meaning two square cuts spaced a certain distance apart with a peeling in between so that the insulation in the middle of the cable may be removed.

To go from a peel to a square cut or a square cut to a peel is automatic and the direction of rotation could be made obvious by simple symbols, such as arrows, imprinted or otherwise on the unit itself. Thus, no adjustments have to be made in the mechanism, no dials rotated or levers moved to change from one type of operation to the other. Further, the angle of the peel is automatic and may be preset by grinding the blade to whatever angle is desired. The blade, whether it be of the type shown in FIGS. 14–17 or in FIGS. 26–29, automatically pivots from one position to the other so no adjustments are necessary. The depth of the cut is uniform regardless of the angular position of the blade.

The blade of FIGS. 14–17 is constructed to minimize the offset inherent when rocking from "peel" to "square cut". By grinding the back side of the blade on a compound angle, the bottom portion of the blade is tapered. By making the blade more narrow at the bottom, the offset is minimized. This should be as narrow as possible with the limiting factor being the strength of the blade.

The blade cartridge may accommodate a single edge stripping blade. This could be used on conventional insulations as well as hard to strip insulations. A separate cartridge could be available with a special blade for semi-conductive insulation such as in FIG. 18. This blade will be shorter and it may not have a hook on the bottom. It will be used to score the semi-conductive insulation where precision of the cut depth is important. This insulation may then be peeled off by hand or with another tool.

The jaws themselves that define the cable receiving zone are automatically spring biased apart and it is of advantage to have the upper jaw raised with the set screw working against a ramp surface so that it is automatically self-tightening. This is to say that the bias or "push" of the spring tends to raise the rod and upper jaw but the ramp in the rod self-tightens against the set screw. Thus, if there is any slippage, even though the jaws may open a little i.e. the upper jaw move up, it will be a minor amount of movement and the unit will not let go all of a sudden.

The extensible handle arrangement which can be either extended out or tucked in has the advantage that it may be automatically locked in any position by merely rotating the handle in either direction so that the cam locking surfaces bind. Thereafter, it may be loosened by rotating the handle in the opposite direction and then telescoping it either in or out to another position and then locking it there. For working, it may be moved all the way out and locked so that the maximum mechanical leverage will be obtained, while for either traveling or use in tight places, it may be telescoped in, possibly all the way in. For traveling, the fact that it will telescope all the way in provides a compact unit so that it may be easily carried and/or stored. Also, the handle is not made in a separate or removable part or piece so that there is no "loose part" problem. And the handle will lock and unlock in any position by rotating either clockwise or counterclockwise.

It will be also noted that the center line of the blade is offset in the direction of the channels of the cable receiving zone. Therefore, the center of gravity of the overall unit is much more efficiently located. This aids in easier starting and permits the force applied to the handle to be perpendicular to the cable.

The normal sequence of operations is to peel first, say, from the end of the cable inwardly to whatever length it is desired to remove and then cut the insulation square. But it could be the other way.

Since the same blade is used for both peeling and square cutting and it is located directly next to or aligned with the handle, there is no offset or displaced torque applied. This is to say that the torque applied by the handle is transmitted directly to the cutting blade, regardless of whether the device is peeling or cutting square. The advantages of a full bearing surface whether peeling or square cutting are substantial.

There are occasions where a metallic shield covers a conductor or several conductors. To remove this metallic shield, a cartridge with a hardened steel wheel as in FIG. 22, similar to a tubing cutter, may be used.

The cartridge should be installed and adjusted to moderate pressure. The tool may then be rotated a minimum of one revolution and re-adjusted to a moderate pressure and again rotated. This procedure is repeated until the metallic shield is severed.

The arrangement shown in FIGS. 21 and 22 has the advantage that it could be a tubing cutter and would be very useful with thin tubing. But as well it could be used with insulation of various types and is not restricted to any particular form.

To give the unit a wider range of cable sizes, various plates or shims could be positioned and attached against the inner surface of the lower trough or slot 30 to either bring down the minimum size of the cable receiving zone or to enlarge it by removing the shims. But these have not been shown and their shape and manner of connection may be in any suitable fashion. It is also possible to add shims to the top trough with a larger included angle so as to increase the diameter range.

Using a pivoted clip or key to releasably hold the cartridge in place has the advantage that no separate or loose pieces are required. Further, the interchangeable cartridge has the advantage that it can be quickly and easily replaced so as to provide a different cutting tool. And with a unit of this nature, a whole series of cartridges could be supplied so that the user could perform a multiple of functions. Also, different blades could be supplied, possibly as a part of a series, say, in a kit. Referring to the FIGS. 10-17 form, since the peel angle for any particular blade is set, a series could be provided with various peel angles. In the FIGS. 23-29 form, the stop 216 might be made adjustable so that the peel angle could be changed without changing the blade.

It will also be noted that the threads between top cap and blade holder are left hand threads so that the normal direction of rotation of the cap will cause the blade to move either in or out. If right hand threads were used, the directions of rotation would be awkward to the user.

The lifting lip on the blade shown in FIGS. 7 and 13 may be highly desirable in certain types of stripping situations and unnecessary in others. So it should be understood that a blade of the general character shown in FIGS. 14-17 is not necessarily limited to a lifting lip or ledge. But this is not to diminsh the importance of the lip in certain types of stripping situations.

One of the advantages of a cartridge of the type shown in FIGS. 30-33 is that the cutting edge will automatically orient itself in the square cut position or in the peel position. And in fact the peel could be a straight axial pull rather than on a helix. The direction of cut, i.e. clockwise or counterclockwise, may be determined by the bias force applied to the handle. With certain types of insulation, this type of blade arrangement could be highly advantageous.

In the type of blade shown in FIGS. 10-13, undercutting the edge for peeling by grinding the lip in kind of a reverse grind has the advantage that even though a lip is provided which in a sense reaches under the insulation and tends to raise it, nevertheless a sharp cutting edge is presented to slice through the insulation during peeling. In those situations where the particular job might not require the lifting lip, the lower arcuate edge of the blade would not have a shallow triangle but rather would have a more or less sharp cutting edge but swung on an arc about the pivot of the blade.

Whereas the preferred form and a number of variations of the inventions have been shown, particularly as to the form of cartridge or insert that is used, it will be understood that numerous additional modifications, changes, substitutions and alterations may be made without departing from the invention's fundamental theme.

We claim:

1. In a tool for removing insulation from an insulated cable, including clamping jaws constructed to perform an opening and closing action and defining a cable receiving zone therebetween so that a cable may be placed therein, the zone permitting rotation of the jaws and cable relative to each other, a cutting blade projecting from one of the jaws into the cable receiving zone, and means for automatically causing the blade to cut a helical path in the cable insulation when the cable and jaws are rotated in one direction relative to each other and to cut a circular path in the cable insulation when the cable and jaws are rotated in the other direction relative to each other.

2. The structure of claim 1 further characterized by and including means for varying the degree of projection of the blade so that different thicknesses of insulation may be cut.

3. The structure of claim 1 further characterized in that the projecting blade has a cutting edge on opposite longitudinal edges thereof, the blade being pivoted to a limited extent in the one jaw so that one cutting edge or the other is effective depending upon the direction of rotation of the tool relative to the cable.

4. The structure of claim 1 further characterized in which the projecting cutting blade is generally flat and somewhat rectilinear in outline and has a cutting edge on each longitudinal edge thereof, one of the cutting edges being formed by two intersecting surfaces at an angle which is bisected by a line generally perpendicular to the axis of the cable receiving zone and the other cutting edge is formed by two intersecting surfaces at an angle which is not bisected by a line generally perpendicular to the axis of the cable receiving zone.

5. The structure of claim 4 in which the cutting edges converge in a direction toward the cable receiving zone.

6. The structure of claim 3 further characterized in that the blade is pivoted about an axis generally at right angles to the axis of the cable receiving zone and intersecting the cable receiving zone.

7. The structure of claim 3 further characterized in that the blade is pivoted about an axis offset from and nonconvergent with the axis of the cable receiving zone.

8. The structure of claim 1 further characterized by and including a hook on the end of the blade which causes the blade to tend to lift the insulation as it cuts.

9. The structure of claim 5 in which the end of the blade is defined by a generally arcuate cutting edge.

10. The structure of claim 9 in which the arcuate cutting edge on the end of the blade is swung on an arc about the blade's pivot.

11. The structure of claim 9 in which the cutting edge on the end of the blade is a narrow triangle with its point contiguous to the longitudinal cutting edge that cuts a circular path and its base contiguous to the longitudinal cutting edge that cuts a helical path.

12. A tool for cutting the outer surface of a cable, jaws constructed to perform an opening and closing action and defining a cable receiving zone and having areas in the zone which engage the cable in circumferentially spaced locations and permitting rotation of the jaws and cable relative to each other, a cutting element on the jaws to penetrate the outside of the cable, a handle extending from the jaws to provide leverage during rotation of the tool relative to the cable, telescoping extensible parts in the handle so that the length of the handle may be varied, and a locking mechanism effective between the extensible parts such that the parts may be locked together in any position so that a maximum number of handle lengths may be acquired, thereby fitting the leverage of the handle to the particular stripping application.

13. The structure of claim 12 further characterized in that the tool is constructed for removing the insulation from an insulated cable and further characterized in that the cutting element is in the form of a cutting blade adapted to penetrate the insulation on the scale.

14. The structure of claim 12 further characterized by and including a spring for automatically biasing the jaws apart to an open position so that the cable may be inserted, and a set screw for holding the jaws in a closed position against the bias of the spring.

15. A tool for cutting the outer surface of a cable, jaws constructed to perform an opening and closing action and defining a cable receiving zone and having areas in the zone which engage the cable in circumferentially spaced locations and permitting rotation of the jaws and cable relative to each other, a cutting element on the jaws to penetrate the outside of the cable, a handle extending from the jaws to provide leverage against rotation of the tool relative to the cable, a spring for automatically biasing the jaws apart to an open position so that the cable may be inserted, a set screw for holding the jaws in a closed position against the bias of the spring mounted in one of the jaws, and an elongated surface on the other jaw opposite the set screw, the elongated surface being tapered in a direction relative to the path of opening movement of the jaws under the bias of the springs such that the set screw is self-tightening.

16. In the tool for cutting the outer surface of a cable, including clamping jaws constructed to perform an opening and closing action and defining a cable receiving zone therebetween so that a cable may be placed therein, a socket in one of the jaws opening into the cable receiving zone, a cartridge with a cable stripping tool thereon insertable into the socket so as to position the stripping tool in operative position in the cable receiving zone, a key movably mounted in one of the jaws and cooperating with the socket and with the cartridge so as to releasably hold the cartridge in the socket, the key being in the form of a latch which is movably connected to the tool to move between an inner position where it is effected between the tool holder and one of the jaws such that rotation of the cap will cause the tool holder to advance or retreat, and an outer position where it releases the cartridge, the latch being mounted on the tool so that it does not become separated from the tool.

17. In a tool for removing insulation from an insulated cable, including clamping jaws constructed to perform an opening and closing action and defining a cable receiving zone therebetween so that a cable may be placed therein, the zone permitting rotation of the jaws and cable relative to each other, a cutting blade projecting from one of the jaws into the cable receiving zone, and means for automatically causing the blade to cut a helical path in the cable insulation and also a circular path in the cable insulation depending upon the direction of movement of the cable and jaws relative to each other.

18. A tool for cutting the outer surface of a cable, jaws constructed to perform an opening and closing action and defining a cable receiving zone and having areas in the zone which engage the cable in circumferentially spaced locations and permitting rotation of the jaws and cable relative to each other, a cutting element on the jaws to penetrate the outside of the cable, a handle extending from the jaws to provide leverage during rotation of the tool relative to the cable, telescoping extensible parts in the handle so that the length of the handle may be varied and, at the same time, the jaws may be opened and closed, a spring for biasing the telescoping parts apart so that the jaws are biased to their open position, a set screw on one of the jaws for holding the jaws in a closed position against the bias of the spring, and an elongated surface on the other jaw and its extensible part opposite the set screw and tapered in a direction such that the set screw is self-tightening under the bias of the spring.

* * * * *